United States Patent [19]

Egalon et al.

[11] Patent Number: 5,343,035

[45] Date of Patent: Aug. 30, 1994

[54] STRAIN SENSOR COMPRISING A STRAIN SENSITIVE, TWO-MODE OPTICAL

[75] Inventors: Claudio O. Egalon; Robert S. Rogowski, both of Hampton, Va.

[73] Assignee: The United States of America as represented by the Administrator of the National Aeronautics and Space Administration, Washington, D.C.

[21] Appl. No.: 999,696

[22] Filed: Dec. 21, 1992

[51] Int. Cl.$^5$ .............................................. H01J 5/16
[52] U.S. Cl. ................................... 250/227.14; 385/12
[58] Field of Search ............... 250/227.14, 227.16, 250/227.19, 227.24, 227.27, 227.28, 231.1, 231.19; 356/32, 35.5, 345; 385/12, 13, 123, 128, 141, 96; 73/800

[56] References Cited

U.S. PATENT DOCUMENTS

| | | | |
|---|---|---|---|
| 4,427,263 | 1/1984 | Lagakos et al. | 385/128 |
| 4,548,630 | 10/1985 | Biedka | 385/96 X |
| 4,621,896 | 11/1986 | Lagakos et al. | 385/128 |
| 4,709,987 | 12/1987 | Blackburn et al. | 385/141 |
| 4,761,073 | 8/1988 | Meltz et al. | 356/32 |
| 4,770,492 | 9/1988 | Levin et al. | 250/227.14 X |
| 4,841,778 | 7/1989 | Butler et al. | 73/800 |
| 4,863,270 | 9/1989 | Spillman, Jr. | 250/227.19 X |
| 4,918,305 | 4/1990 | Wlodarczyk et al. | 250/227.14 |
| 4,928,004 | 5/1990 | Zimmermann et al. | 250/227.14 |
| 4,979,798 | 12/1990 | Lagakos et al. | 385/12 |
| 4,983,034 | 1/1991 | Spillman, Jr. | 356/32 |
| 4,994,668 | 2/1991 | Lagakos et al. | 250/227.19 |
| 5,020,379 | 6/1991 | Berthold et al. | 73/800 |
| 5,026,141 | 6/1991 | Griffiths | 385/13 |
| 5,064,270 | 11/1991 | Turpin et al. | 385/13 |
| 5,132,529 | 7/1992 | Weiss | 250/227.16 |

OTHER PUBLICATIONS

"Fiber Optics Strain Gauge" by Butter et al., in *Applied Optics,* vol. 17, pp. 2867–2869, Sep., 1978.
"Complete Phase-Strain Model for Structurally Embedded Interferometric Optical Fiber Sensors" by Sirkis et al., in *Journal of Intellegent Material Systems and Structures,* vol. 2, pp. 3–24, 1991.
"Deformation of Single Mode Optical Fibers Under Static Longitudinal Stress" by Bertholds et al., in *Journal of Lightware Technology,* vol. LT-5, No. 7, pp. 895–900, Jul. 1987.
*Optical Waveguide Theory* by Snyder et al., p. 253, 1983.

*Primary Examiner*—David C. Nelms
*Assistant Examiner*—John R. Lee
*Attorney, Agent, or Firm*—George F. Helfrich; Kimberly A. Chasteen; Harry Lupuloff

[57] ABSTRACT

A strain sensor uses an optical fiber including a strain sensitive portion and at least one strain insensitive portion. The strain sensitive portion is mounted on the surface of a structure at a location where a strain is desired to be measured. The strain insensitive portion(s) may be fused to the strain sensitive portion to transmit light therethrough, so that the resulting pattern may be detected to determine the amount of strain by comparison with a similar fiber not subjected to strain, or with the light pattern produced when the fiber is not under strain.

6 Claims, 4 Drawing Sheets

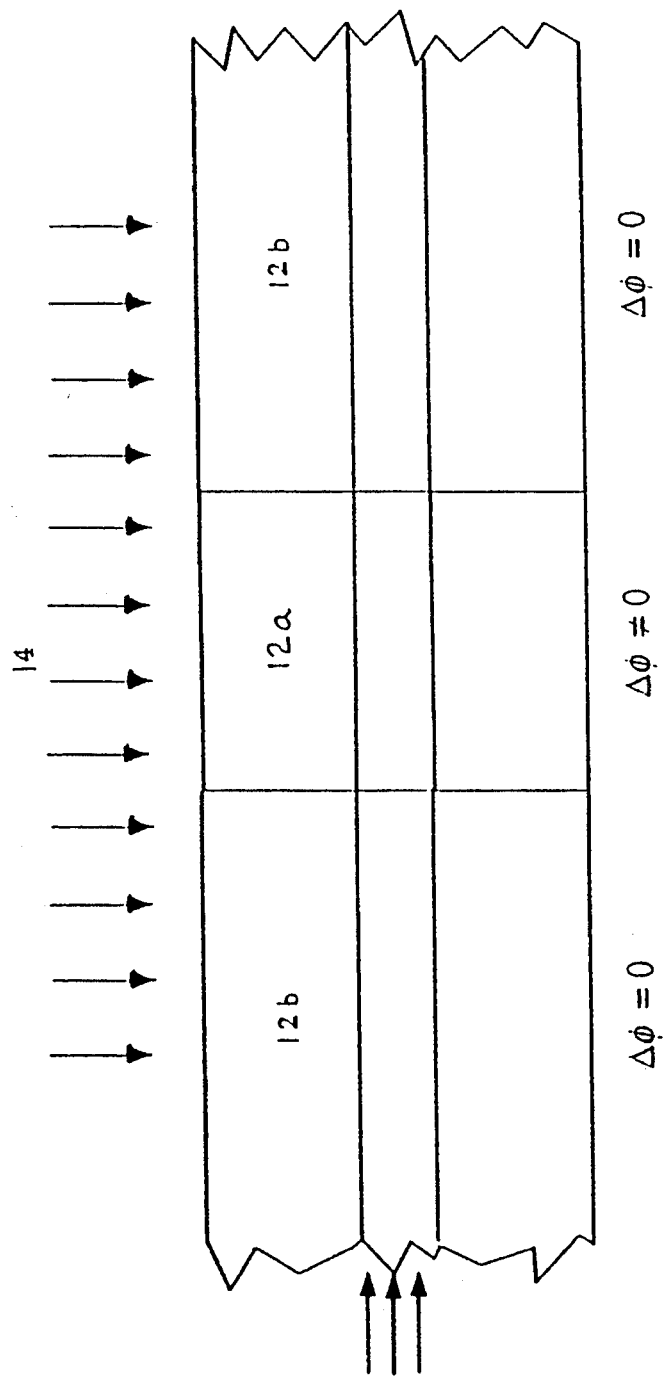

STRAIN SENSOR COMPRISING A STRAIN SENSITIVE, TWO-MODE OPTICAL

CROSS-REFERENCE TO RELATED APPLICATION

This application is related to the following U.S. patent application filed on the same date and assigned to the same assignee by the same inventors: OPTICAL FIBER STRAIN SENSOR WITH IMPROVED LINEARITY RANGE, Ser. No. 07/994,593 (NASA case No. LAR 14,857-1-SB), which is incorporated herein by reference. Background of the Invention

BACKGROUND OF THE INVENTION

1. Field of the Invention

The present invention is directed to an optical fiber strain sensor and, more particularly, to an optical fiber strain sensor which can measure strain at discrete locations anywhere on the surface of a structure.

2. Description of the Related Art

A known technique for measuring strain is to use the light transmitted by an optical fiber affixed to an object under strain. Conventionally, the modal pattern produced by light at the receiving end of an optical fiber under strain is monitored to detect changes in the modal pattern. The changes in the pattern are caused by changes in the optical path length due to changes in the index of refraction and the propagation constants of each fiber mode. As a result, the modal phase term, $\beta_{In}z$, of the electric fields is shifted by an amount $\Delta\Phi$. This phase shift phenomenon has been theoretically studied and experimentally used in applications that involve determination of strain using single mode, few mode and multimode fibers.

A single mode fiber is the simplest kind of strain sensor using optical fibers. It is basically an interferometer that compares the modal phase shift of two fibers: one fiber is subjected to strain and the other serves as a reference. Such a device is described in "Fiber Optics Strain Gauge" by Butter et al. in *Applied Optics*, vol. 17, pages 2867-2869, September 1978, for surface mounted sensors using "weakly guiding" optical fibers. Another example of strain sensors using weakly guiding optical fibers was described in "Complete Phase-Strain Model for Structurally Embedded Interferometric Optical Fiber Sensors" by Sirkis et al. in the *Journal of Intelligent Material Systems and Structures*, vol. 2, pages 3-24 (1991). The latter paper describes both surface mounted and embedded sensors in many strain field configurations.

There are several drawbacks to optical fiber strain sensors using known techniques. First, the phenomenon has only begun to be investigated and the theoretical underpinnings are not fully understood. Second, for multi-mode fibers the shifting of patterns can be complex and requires either an intelligent detector, or careful alignment of a detector with a pattern produced for a given amount of strain. Third, strain is measured over the entire length of the optical fiber with the result that it is difficult to mount an optical strain sensor to measure strain at a discrete location.

SUMMARY OF THE INVENTION

An object of the present invention is to provide an optical fiber strain sensor which measures strain easily.

Another object of the present invention is to provide an optical fiber strain sensor which can use many different types of optical fibers.

Yet another object of the present invention is to provide an optical fiber strain sensor which can be mounted easily in many different ways.

The above objects are attained by providing a strain sensor, comprising: a strain sensitive optical fiber; at least one strain insensitive optical fiber disposed to transmit light passing through the strain sensitive optical fiber; light supply means for supplying the light passing through the strain sensitive optical fiber and transmitted by the at least one strain insensitive optical fiber; and light detection means for detecting the light passing through the strain sensitive optical fiber and transmitted by the at least one strain insensitive optical fiber. In the preferred embodiment, a pair of strain insensitive optical fibers are used, one to supply light to the strain sensitive optical fiber and the other to supply the light output by the strain sensitive optical fiber to the light detection means. The strain sensitive optical fiber may be any conventional strain sensitive optical fiber or a two-mode optical fiber constructed according to the related, copending patent application Ser. No. 08/233,931, filed Dec. 12, 1992, entitled OPTICAL FIBER STRAIN SENSOR WITH IMPROVED LINEARITY RANGE wherein the two-mode optical fiber is constructed of materials producing an intermodel phase difference of $\delta\Phi - \Phi$ of 0.17 radians when subjected to stress within a measurable range of the strain sensor. The strain insensitive fibers may be weakly guiding fibers or strongly guiding fibers. The characteristics of the strain insensitive fibers are described in more detail below.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 3 and 4 are block diagrams of the present invention.

DESCRIPTION OF THE PREFERRED EMBODIMENT

Figure 1:
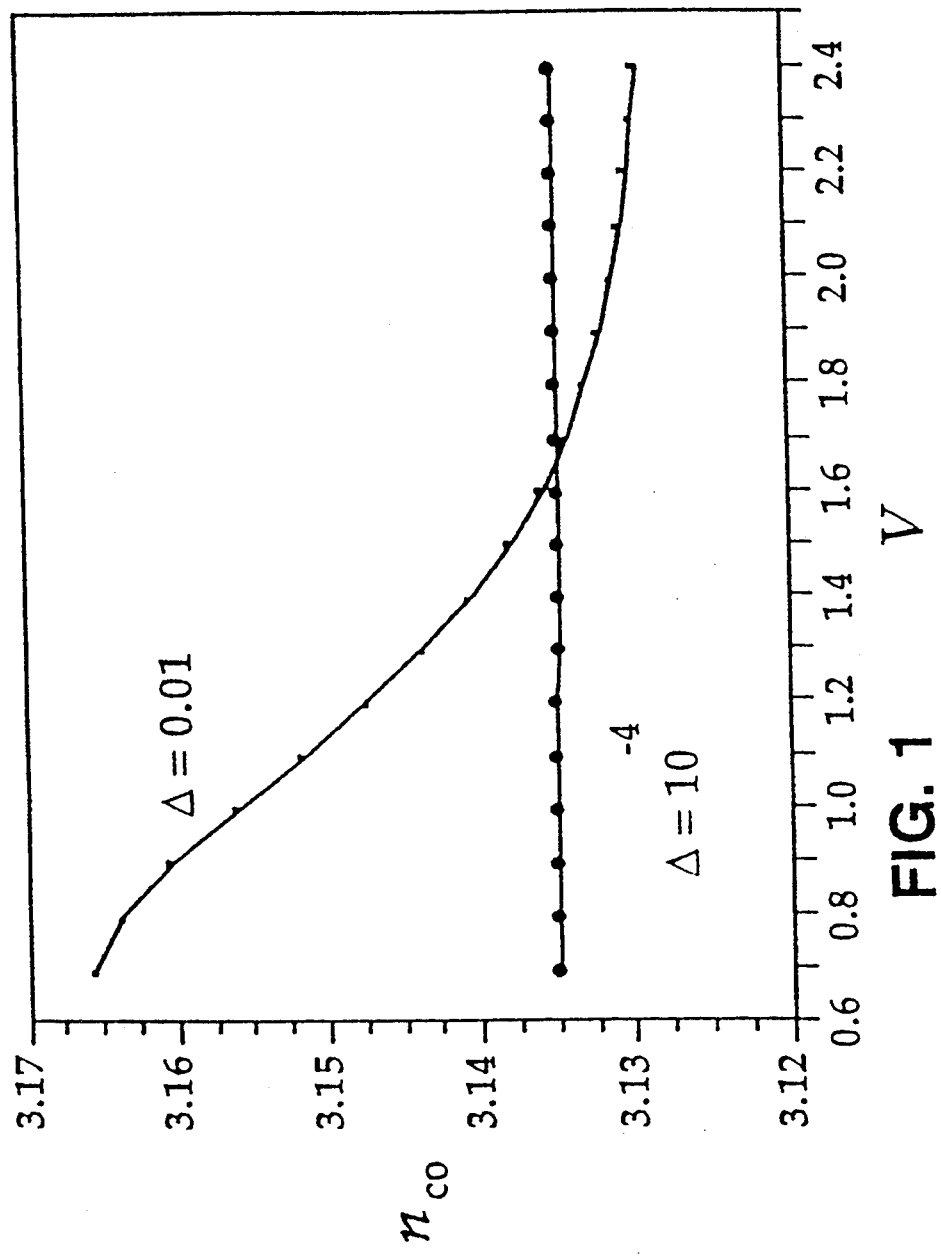
FIGS. 1 and 2 are plots of the core refractive index versus the V number for some strain insensitive optical fibers.

For a surface mounted straight optical fiber having a circular step index profile which is under axial strain, the normalized phase difference $\delta\Phi/kLS_1$ may be defined as $$n_{eff} + \frac{n_{co}^2}{2n_{eff}} \left[ \left( C^2 \frac{(-\Delta + 1)}{\Delta} - 1 \right) D(1 - 2v_f) + C(B(1 - 2v_f) - A) \right] \tag{1}$$

where $\delta\Phi$ is the difference in phase between the fiber under stress and the same fiber or a reference fiber not subjected to stress, k is the wave number of the propagating light, L is the length of the unstressed fiber, $n_{co}$ is the index of refraction of the core of the optical fiber, $v_f$ is the fiber's Poisson ratio, $S_1$ is the strain along the fiber axis, $n_{eff}$ is the so-called effective index of refraction given by $$n_{eff} = \frac{\beta}{k} = n_{co}\sqrt{1 - C\frac{U}{V}}, \quad (2)$$

$$\Delta = \frac{n_{co}^2 - n_{cla}^2}{2n_{co}^2}, \quad (3)$$

$$B = \quad (4)$$

$$\left(-2\frac{\left[(2\Delta - 1)\Delta\frac{\partial}{\partial \Delta}U + (-\Delta + 1)AV\right]n_{co}^2}{V}\right)$$

$$A = \frac{U}{V} - \frac{\partial U}{\partial V}, \quad \frac{P_{11} + 2P_{12}}{3} + A \quad (5)$$

$$C = 2\frac{U\Delta}{V}, \quad (6)$$

$$D = n_{co}^2 \frac{(P_{11} + 2P_{12})}{3}, \quad (7)$$

$$V = ak\sqrt{n_{co}^2 - n_{cla}^2}, \quad (8)$$

$\beta_{ln}$ is the propagation constant of mode $l$ and rank n, $n_{cla}$ is the index of refraction of the cladding of the optical fiber, a is the radius of the core of the optical fiber, $P_{ij}$ are elements of the strain-optic tensor as described "Deformation of Single Mode Optical Fibers under Static Longitudinal Stress" by Bertholds et al. in the *Journal of Lightwave Technology*, vol. LT-5, no. 7, pages 895–900, July 1987, and U is a solution to a transcendental equation from *Optical Waveguide Theory* by Snyder et al., 1983, Optical Waveguide Theory Table 12-4, pg. 253 for exact solution, and Table 14-6, p. 319 for the weakly guiding solution.

Equation (1) represents normalized phase shift $\delta\Phi_{nor}$. As indicated on the right side of equation (1), for a surface mounted fiber under uniaxial strain, the normalized phase shift $\delta\Phi_{nor}$ is a function of $n_{co}$, V, $P_{11}$, $P_{12}$, $\nu_f$ and $\Delta$. The terms that involve the A and B parameters indicated in equations (4) and (5) are part of the so-called dispersion term which, for single mode fibers, was previously considered negligible. However, as the difference between the refractive indices of the core and cladding increase, the contribution of the dispersion term increases. As a result, these terms cannot be neglected for strongly guiding fibers measuring a significant amount of strain. The design flexibility of a strongly guiding optical fiber which is strain insensitive per the disclosed construction is further increased by the additional $\Delta$ parameter.

Equation (1) uses what is known as the exact solution which applies to all optical fibers. One class of optical fibers meets the weakly guiding condition where $\Delta$ (equation 3) is less than 0.01. For weakly guiding optical fibers, equation (1) may be rewritten as equation (9)

$$\frac{\delta\phi_{ln}}{LS_1} = \beta_{ln} + \left(\frac{U_{ln}2n_{cla}^2}{a^2\beta^2} - \beta_{ln}n_{co}^2\right)P_{ef} - \quad (9)$$

$$\frac{\eta_{ln}U^2}{a^2\beta_{ln}}(\nu_f + (n_{co}^2 + n_{cla}^2)P_{ef}),$$

where $P_{ef}$ is defined as the effective strain-optic coefficient or $$P_{ef} = \frac{(P_{12} - \nu_f(P_{11} + P_{12}))}{2}, \quad (10)$$

$$\eta_{ln} = \frac{K_l^2}{K_{l+1}K_{l-1}} \quad (11)$$

and $K_l$ is the modified Bessel function of second kind of order $l$ with argument given by equation (12).

$$W_{ln} = \sqrt{V^2 - U_{ln}^2}, \quad (12)$$

Single mode optical fibers have been used in interferometric sensors where phase shift is related to strain. To obtain a phase insensitive fiber, equation (9) must be set equal to zero. The resulting equation is a polynomial of third order in $n_{co}$ which can be reduced to a second order one. This polynomial has two solutions, one positive and the other negative. Since the negative solution does not apply ($n_{co}$ is always positive), equation (13) represents the solution for $n_{co}$.

$$n_{co} = \frac{1}{\sqrt{P_{ef}}} + \frac{\Delta U_{01}^2}{\sqrt{P_{ef}}\, V^2}[1 - \eta_{01}(2 + \nu_f)] \quad (13)$$

Equation (13) defines a single mode weakly guiding optical fiber which is insensitive to strain. In other words, if any four of the five parameters are given, the fifth one obtained from the above relation defines a strain insensitive fiber.

Two mode optical fibers have been used as modal domain sensors for measuring strain. To determine the strain in the fiber, the intensity of the fiber's output pattern is monitored. The resulting pattern is determined by the interference of the $LP_{01}$ and $LP_{11}$ modes and their respective phase shifts. If one neglects the effect of mode coupling, the intensity of the mode pattern with phase shift can be written as proportionality (14)

$$I \propto \cos(\delta\beta + \delta\Phi_{01} - \delta\Phi_{11}), \quad (14)$$

where $\delta\beta$ is the difference between the propagation constants of the $LP_{01}$ and $LP_{11}$ modes and $\delta\Phi_{01}$ and $\delta\Phi_{11}$ are their respective phase shifts. For a two mode fiber modal domain sensor, the term that determines the sensitivity to strain is the difference between the phase shifts of the two modes, i.e., $\delta\Phi_{01} - \delta\Phi_{11}$ which can be written as equation (15).

$$\delta\phi_{01} - \delta\phi_{11} = n_{co}\frac{\Delta k LS_1}{V^2}\sum_{l=0}^{1}(-1)^{l+1}U_{l,1}^2(1 + 2\eta_{l,1}\nu_f - \quad (15)$$

$$(3 - 4\eta_{l,1})n_{co}^2 P_{ef})$$

For a strain insensitive fiber $\delta\Phi_{01} - \delta\Phi_{11} = 0$, equation (15) reduces to equation (16).

$$n_{co} = \sqrt{\frac{U_{01}^2(1 + 2\eta_{01}v_f) - U_{11}^2(1 + 2\eta_{11}v_f)}{P_{ef}(U_{01}^2(3 - 4\eta_{01}) - U_{11}^2(3 - 4\eta_{11}))}} \quad (16)$$

Notice that Equation (16), in contrast to Equation (13), involves only four parameters: $n_{co}$, V, $P_{ef}$ and $v_f$. Equation (16) defines a two mode weakly guiding optical fiber which is insensitive to strain, i.e., given any three of the four parameters, the fourth one, when obtained from the above relations, defines a two mode insensitive fiber.

Figure 2:
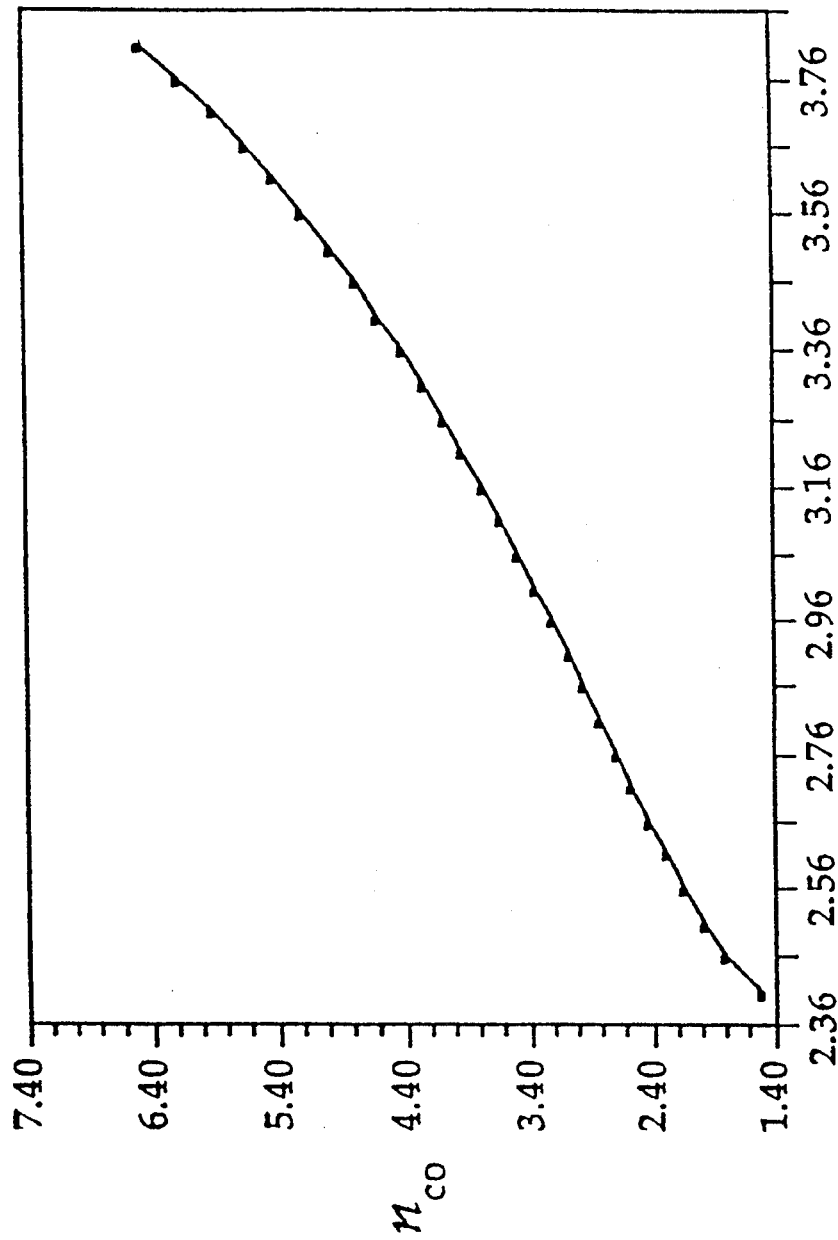

FIG. I is a plot of the core refractive index $n_{co}$ versus the V number for a single mode strain insensitive weakly guiding fiber for $\Delta = 10^{-2}$ and $\Delta = 10^{31.4}$. FIG. 2 is a plot of the core refractive index $n_{co}$ versus the V number for a two mode strain insensitive weakly guiding fiber. In both Figures, the values used for the strain-optic coefficients and the Poisson ratio correspond to a silica fiber, i.e., $P_{11} = 0.121$, $P_{12} = 0.27$ and $v_f = 0.17$. In FIG. 1, the refractive index for a single mode strain insensitive optical fiber is very high, approximately 3.135. While it is difficult to obtain such a high refractive index from commercially available glasses, one could either use infrared transmitting materials, like silicon, or work with regular glasses in the region of anomalous dispersion. For both cases, the refractive index is high enough to satisfy the strain insensitivity condition of single mode strain sensors, i.e., high refractive index. Also, notice that, for single mode weakly guiding optical fibers, the second term of Eq. (13) can neglected since it contributes roughly 1% or less to the final result.

As illustrated in FIG. 2, the core refractive index $n_{co}$ depends strongly on the V number for a two mode fiber. Optical fibers are commercially available with core refractive indices and V numbers in the lower left-hand portion of FIG. 2. For example, glasses that can be used for making optical fibers are available with the following refractive indices: 1.56, potash soda; 1.693, high lead; 1.76, sapphire; 1.9–2.9, germanate; and 2.5, chalcogenide glasses. In particular, an optical fiber with a core refractive index as high as 2.5 is available from Infrared Fiber Systems of Silver Spring, Md.

Figure 3:
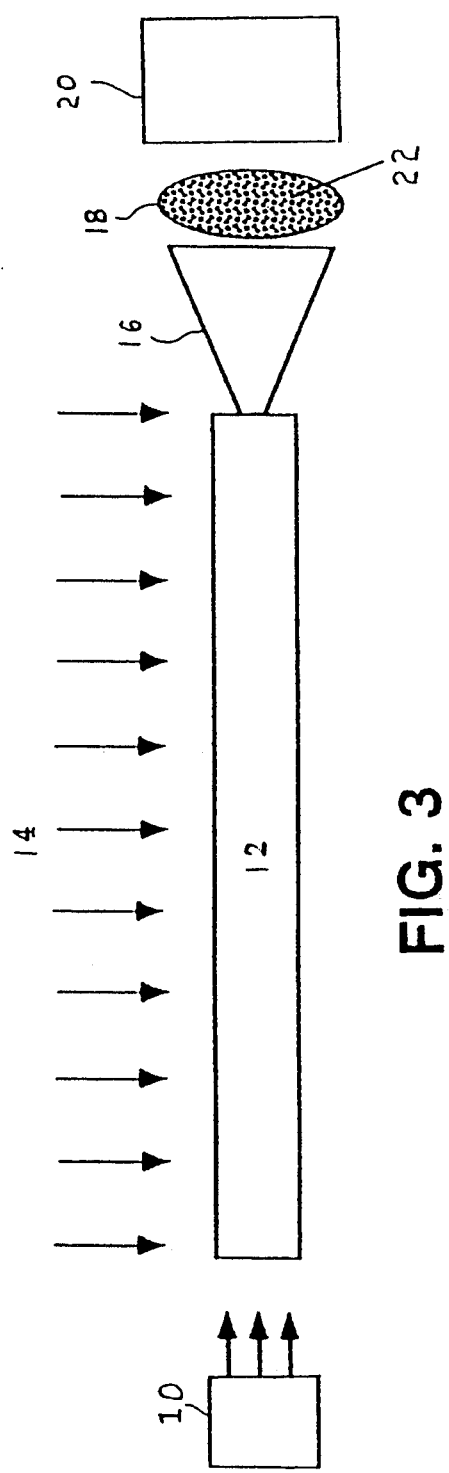

Materials like those described above can be used to construct a strain sensor as illustrated in FIG. 3. A light source 10 supplies light to the optical fiber 12 which is exposed to axial strain represented by arrows 14. The light source has a wavelength within the anomalous dispersion region of the glass used to construct the optical fiber core. The output 16 from the optical fiber 12 produces a pattern 18. A light sensitive element 20, such as a photodiode or photodiode array detects the light emerging from the optical fiber 12. As illustrated in FIG. 4, the optical fiber 12 includes a strain sensitive portion 12a constructed in a conventional manner or as disclosed in the related patent application cited above, while the remaining portions 12b of the optical fiber 12 are constructed as described above to be essentially strain insensitive. The differently constructed fibers may be joined using a fusion splicer, such as a model 320 from Power Technology, Inc. Of course, if strain is desired to be measured close to where it is convenient to locate the light source 10 or light detector 20, a single strain insensitive fiber may be used to transmit light from or to the other device.

The many features and advantages of the present invention are apparent from the detailed specification, and thus it is intended by the appended claims to cover all such features and advantages of the apparatus which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, as falling within the scope and spirit of the invention.

We claim:

1. A strain sensor, comprising:
   a strain sensitive, two-mode optical fiber;
   a least one strain insensitive optical fiber disposed to transmit light passing through said strain sensitive, two-mode optical fiber;
   light supply means for supplying the light passing through said strain sensitive, two-mode optical fiber and transmitted by said at least one strain insensitive optical fiber; and
   light detection means for detecting the light passing through said strain sensitive, two-mode optical fiber and transmitted by said at least one strain insensitive optical fiber.

2. A strain sensor as recited in claim 1, wherein said at least one strain insensitive optical fiber comprises a first strain insensitive optical fiber transmitting light from said light supply means to said strain sensitive, two-mode optical fiber and a second strain insensitive optical fiber transmitting light from said strain sensitive, two-mode optical fiber to said light detection means.

3. A strain sensor as recited in claim 2, wherein said strain sensitive, two-mode optical fiber has first and second ends fused to said first and second strain insensitive optical fibers, respectively.

4. A strain sensor as recited in claim 2, wherein said strain insensitive optical fiber is a single mode optical fiber with a core refractive index $n_{co}$ of $$n_{co} = \frac{1}{\sqrt{P_{ef}}} + \frac{\Delta U_{01}^2}{\sqrt{P_{ef}V^2}} [1 - \eta_{01}(2 + v_f)],$$

where $P_{ef}$ is an effective strain-optic coefficient, $$P_{ef} = \frac{(P_{12} - v_f(P_{11} + P_{12}))}{2},$$

$$\eta_{ln} = \frac{K_l^2}{K_{l+1}K_{l-1}}$$

and $K_l$ is a modified Bessel function of second kind of order/with argument given by $$W_{ln} = \sqrt{V^2 - U_{ln'}^2}.$$

5. A strain sensor as recited in claim 1, wherein one end of said strain sensitive, two-mode optical fiber is fused to an end of said at least one strain insensitive optical fiber.

6. A strain sensor, comprising:
   a strain sensitive, two-mode optical fiber;
   at least one strain insensitive optical fiber disposed to transmit light passing through said strain sensitive, two-mode optical fiber;

one end of said strain sensitive, two-mode optical fiber is fused to an end of said at least one strain insensitive optical fiber;

light supply means for supplying the light passing through said strain sensitive, two-mode optical fiber and transmitted by said at least one strain insensitive optical fiber; and light detection means for detecting the light passing through said strain sensitive, two-mode optical fiber and transmitted by said at least one strain insensitive optical fiber.

* * * * *